United States Patent
Huang

(10) Patent No.: US 11,586,420 B2
(45) Date of Patent: Feb. 21, 2023

(54) BLOCKCHAIN RANDOM NUMBER GENERATING SYSTEM AND BLOCKCHAIN RANDOM NUMBER GENERATING METHOD

(71) Applicant: Acer Incorporated, New Taipei (TW)

(72) Inventor: Shao-Nung Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 485 days.

(21) Appl. No.: 16/855,981

(22) Filed: Apr. 22, 2020

(65) Prior Publication Data

US 2021/0286595 A1 Sep. 16, 2021

(30) Foreign Application Priority Data

Mar. 11, 2020 (TW) ................................ 109107950

(51) Int. Cl.
*G06F 7/58* (2006.01)
*H04L 9/00* (2022.01)
*H04L 9/32* (2006.01)

(52) U.S. Cl.
CPC ............. *G06F 7/588* (2013.01); *G06F 7/582* (2013.01); *H04L 9/3239* (2013.01); *H04L 9/50* (2022.05)

(58) Field of Classification Search
CPC .................. G06F 7/58–588; H04L 9/50; H04L 9/3236–3242; H04L 9/0869
See application file for complete search history.

(56) References Cited

FOREIGN PATENT DOCUMENTS

WO    WO-2018104728 A1 * 6/2018    .............. G06F 7/58

OTHER PUBLICATIONS

Klitos Christodoulou et al., "Randomblocks: A transparent verifiable blockchain-based system for random numbers", Journal of Cellular Automata, vol. 14, pp. 5-6, 2019. (Year: 2019).*

* cited by examiner

*Primary Examiner* — Khoa D Doan
*Assistant Examiner* — Vivian Diem Ha Ledynh
(74) *Attorney, Agent, or Firm* — JCIPRNET

(57) ABSTRACT

The disclosure provides a blockchain random number generating system and blockchain random number generating method. The blockchain random number generating system includes a smart contract. A second electronic device generates a second random number and a second hash value corresponding to the second random number, and transmits the second hash value to a first block of the smart contract. A first electronic device generates a first random number and a first hash value corresponding to the first random number, and transmits the first hash value to a second block of the smart contract. A fifth block of the smart contract receives a real-time transaction index, and generates a random seed according to the real-time transaction index, the first random number and the second random number and calculates a result of the smart contract in the fifth block according to the random seed.

10 Claims, 2 Drawing Sheets

BLOCKCHAIN RANDOM NUMBER GENERATING SYSTEM AND BLOCKCHAIN RANDOM NUMBER GENERATING METHOD

CROSS-REFERENCE TO RELATED APPLICATION

This application claims the priority benefit of Taiwan application serial no. 109107950, filed on Mar. 11, 2020. The entirety of the above-mentioned patent application is hereby incorporated by reference herein and made a part of this specification.

BACKGROUND

Field of the Disclosure

The disclosure relates to a blockchain random number generating system and a blockchain random number generating method, and particularly to a blockchain random number generating system and a blockchain random number generating method capable of generating a random seed that cannot be predicted in advance.

Description of Related Art

In the field of conventional Proof of Work (PoW) blockchain, since each miner needs to get the same operation result for the same segment of smart contract program, the random seed (for example, time parameter) commonly used for general programming is not allowed to be used as a random seed for blockchain smart contracts. Predictable random seed may allow people with bad intentions to evaluate whether the calculation result of random seed is favorable before deciding whether to execute smart contracts. However, the current PoW blockchain has no random seeds that are completely unpredictable for use in smart contract.

SUMMARY OF THE DISCLOSURE

This disclosure provides a blockchain random number generating system and a blockchain random number generating method, which can generate random seeds that cannot be predicted in advance.

The disclosure provides a blockchain random number generating system, which includes a first electronic device, a second electronic device and a smart contract. The second electronic device generates a second random number and a second hash value corresponding to the second number, and transmits the second hash value to a first block of the smart contract. The first electronic device generates a first random number and a first hash value corresponding to the first random number, and transmits the first hash value to a second block of the smart contract. The first electronic device transmits the first random number to a third block of the smart contract and the second electronic device transmits the second random number to the third block. A fifth block of the smart contract receives a real-time transaction index, and generates a random seed according to the real-time transaction index, the first random number and the second random number and calculates a result of the smart contract in the fifth block according to the random seed.

In an embodiment of the disclosure, the above smart contract generates a random seed according to the block hash value of the fourth block, the real-time transaction index, the first random number and the second random number and calculates a result of the smart contract in the fifth block according to the random seed, the block index value of the fourth block is the index value of the fifth block minus one.

In an embodiment of the disclosure, the above-mentioned smart contract issues a penalty corresponding to the first electronic device when determining that the hash result of the first random number is not equal to the first hash value, and the smart contract issues a penalty corresponding to the second electronic device when determining that the hash result of the second random number is not equal to the second hash value.

In an embodiment of the disclosure, when the smart contract receives the first hash value in the second block, the smart contract is in a contract-established state.

In an embodiment of the disclosure, the fifth block of the smart contract receives a real-time transaction index from an external data retrieval function.

This disclosure provides a blockchain random number generating method adaptable for a first electronic device, a second electronic device, and a smart contract. The blockchain random number generating method includes: generating a second random number and a second hash value corresponding to the second random number by a second electronic device, and transmitting the second hash value to the first block of the smart contract; generating a first random number and a first hash value corresponding to the first random number by the first electronic device, and transmitting the first hash value to the second block of the smart contract; transmitting the first random number to the third block of the smart contract by the first electronic device and transmitting the second random number to the third block by the second electronic device; and receiving a real-time transaction index by the fifth block of the smart contract, and generating a random seed according the real-time transaction index, the first random number and the second random number and calculating a result of the smart contract in the fifth block according to the random seed.

In an embodiment of the disclosure, the above smart contract generates a random seed according to the block hash value of the fourth block, the real-time transaction index, the first random number and the second random number and calculates a result of the smart contract in the fifth block according to the random seed, the block index value of the fourth block is the block index value of the fifth block minus one.

In an embodiment of the disclosure, the above-mentioned smart contract issues a penalty corresponding to the first electronic device when determining that the hash result of the first random number is not equal to the first hash value, and the smart contract issues a penalty corresponding to the second electronic device when determining that the hash result of the second random number is not equal to the second hash value.

In an embodiment of the disclosure, when the smart contract receives the first hash value in the second block, the smart contract is in a contract-established state.

In an embodiment of the disclosure, the fifth block of the smart contract receives the real-time transaction index from an external data retrieval function.

Based on the above, in the disclosure, the blockchain random number generating system and the blockchain random number generating method receives a second hash value corresponding to the second random number from the second electronic device by the first block of the smart contract, and the contract is established after the second block of the smart contract receives the first hash value corresponding to the first random number from the first electronic device. Then, the third block of the smart contract receives the first random number from the first electronic device and receives the second random number from the second electronic device to determine whether the first electronic device and the second electronic device are in breach of contract. The fifth block of the smart contract receives the real-time transaction index and generates the random seed according to the real-time transaction index, the first random number and the second random number, and calculates the result of the smart contract in the fifth block according to the random seed. Therefore, neither party can predict or control all the variables in advance to predict the result of contract when the contract is signed.

In order to make the above-mentioned features and advantages of this disclosure more comprehensible, the following embodiments are described in detail with the accompanying drawings as follows.

DESCRIPTION OF EMBODIMENTS

Figure 1:
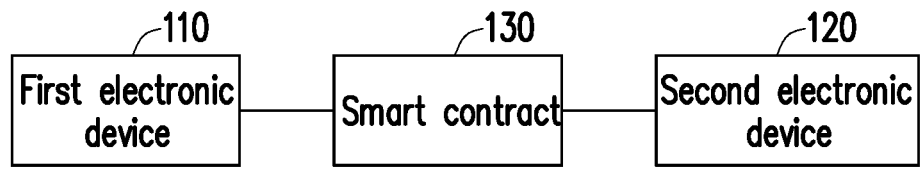
FIG. 1 is a block view of a blockchain random number generating system according to an embodiment of the disclosure.
Figure 2:
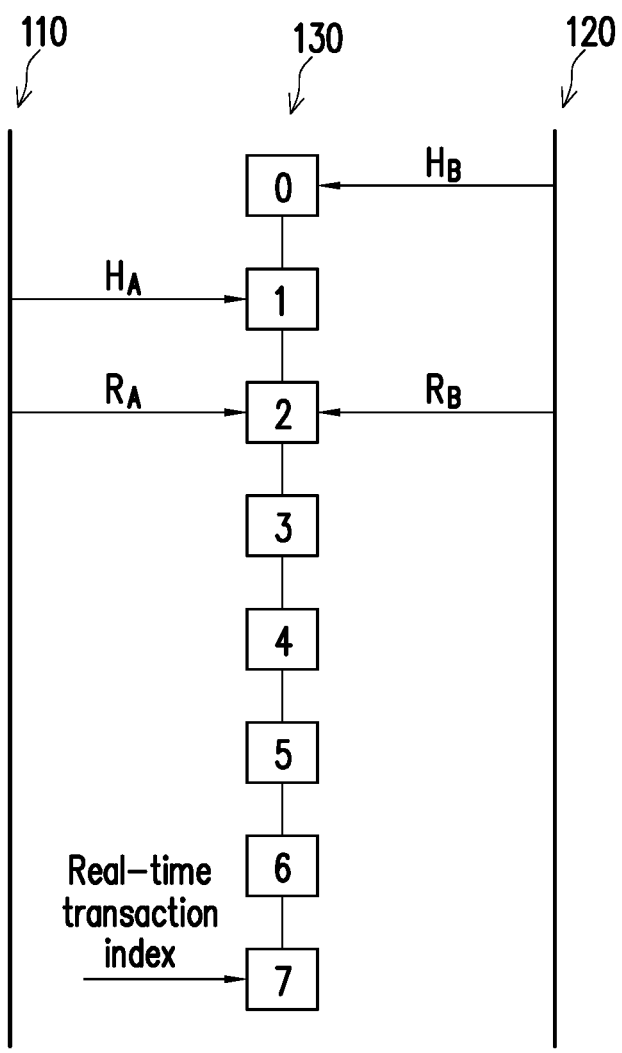
FIG. 2 is a schematic view of a blockchain random number generating system according to an embodiment of the disclosure.

FIG. 1 is a block view of a blockchain random number generating system according to an embodiment of the disclosure. FIG. 2 is a schematic view of a blockchain random number generating system according to an embodiment of the disclosure.

Please refer to FIG. 1 and FIG. 2, a blockchain random number generating system 100 in an embodiment of the disclosure includes a first electronic device 110, a second electronic device 120, and a smart contract 130 (also referred to as a blockchain smart contract). The first electronic device 110 and the second electronic device 120 are, for example, a personal computer, a smart phone, a tablet computer or other similar devices held by the parties executing the smart contract. The smart contract 130 is, for example, a lottery, a multiplayer game, or other similar activities. The first electronic device 110 and the second electronic device 120 represent, for example, both the organizer and the participant of the lottery, or multiple players in a multiplayer game, or two participants in other events.

In an embodiment, the second electronic device 120 generates a second random number (i.e., $R_B$) and a second hash value (i.e., $H_B$=hash $(R_B)$) corresponding to the second random number, and transmits the second hash value (i.e., $H_B$) to a block 0 (or referred to as first block) of the smart contract 130. The first electronic device 110 generates a first random number (i.e., $R_A$) and a first hash value (i.e., $H_A$=hash $(R_A)$) corresponding to the first random number, and transmits the first hash value (i.e., $H_A$) to a block 1 (or referred to as the second block) of the smart contract 130. When the smart contract 130 records the first hash value in the block 1, the contract of the smart contract 130 is established. After the contract is established, the first electronic device 110 transmits the first random number (i.e., $R_A$) to a block 2 (or referred to as the third block) of the smart contract 130, and the second electronic device 120 transmits the second random number (i.e., $R_B$) to the block 2 after the second electronic device 120 confirms that the first random number is written into the blockchain (that is, after confirming that the first electronic device 110 cannot modify the first random number). A block 7 (or referred to as the fifth block) of the smart contract 130 receives a real-time transaction index (for example, real-time NASDAQ index) from an external data retrieval function (for example, oracle function), and generates a random seed according to the real-time transaction index, the first random number and the second random number and calculate the result of the smart contract 130 in the block 7 according to the random seed.

It should be noted that the smart contract 130 may issue a penalty corresponding to the first electronic device 110 when determining that the hash result of the first random number is not equal to the first hash value. The smart contract 130 may issue a penalty corresponding to the second electronic device 120 when determining that the hash result of the second random number is not equal to the second hash value.

In an embodiment, the blockchain random number generating system 100 in the disclosure may not receive the first random number, the second random number, the first hash value, and the second hash value, and the block after the contract is established receives the real-time transaction index and generates a random seed according to the real-time transaction index, and calculates the result of the smart contract 130 according to the random seed.

In an embodiment, the blockchain random number generating system 100 of the disclosure may also receive the first random number, the second random number, the first hash value, and the second hash value without receiving the above-mentioned real-time transaction index, and generate a random seed according to the first random number and the second random number and calculate the result of the smart contract 130 in the block 7 according to the random seed.

In an embodiment, the smart contract 130 may also generate a random seed according to the block hash value of a block 6 (or referred to as the fourth block), the real-time transaction index, the first random number and the second random number, and calculate the result of the smart contract 130 in the block 7 (or referred to as the fifth block) according to the random seed.

In an embodiment, the smart contract 130 may also generate a random seed according to the block hash value of the block 6 (or referred to as the fourth block), the first random number, and the second random number, and calculate the result of the smart contract 130 in the block 7 (or referred to as the fifth block) according to the random seed.

Figure 3:
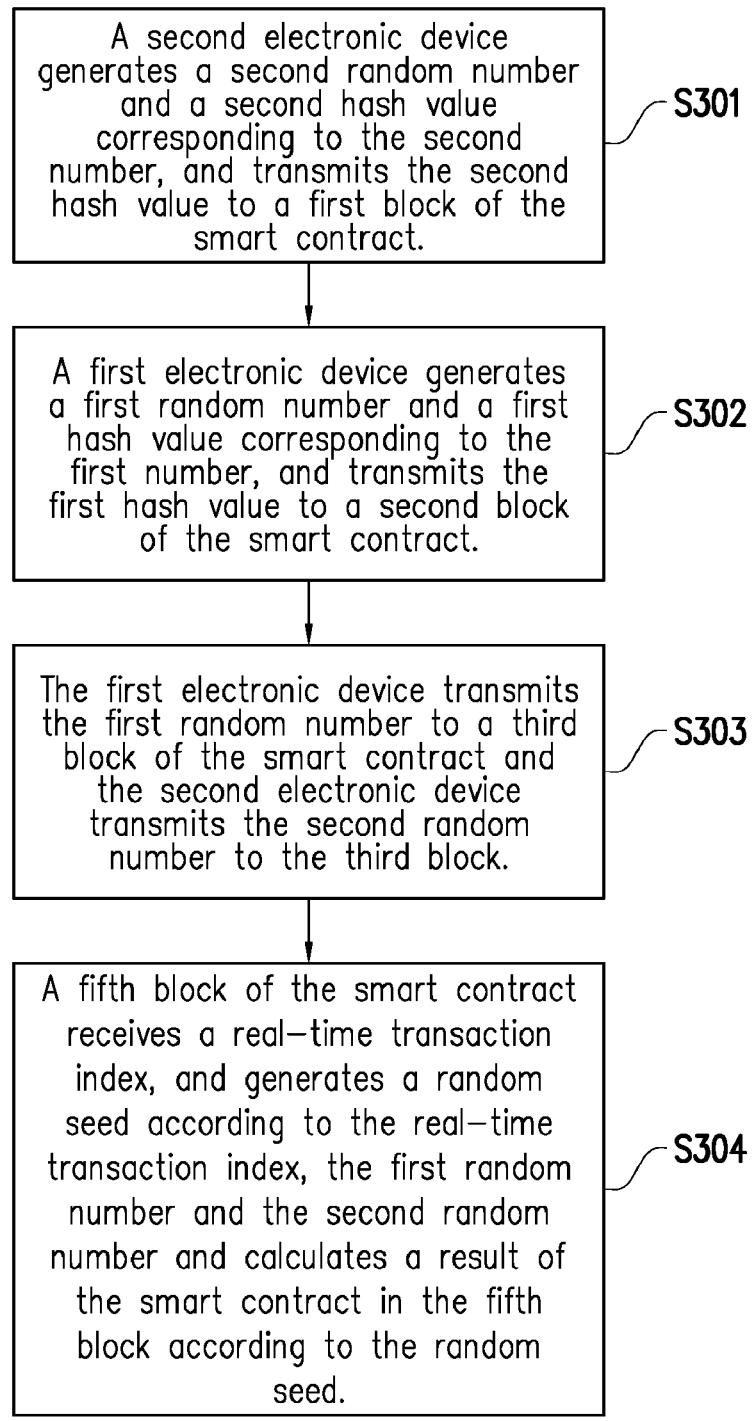
FIG. 3 is a flowchart of a blockchain random number generating method according to an embodiment of the disclosure.

FIG. 3 is a flowchart of a blockchain random number generating method according to an embodiment of the disclosure.

In step S301, the second electronic device generates a second random number and a second hash value corresponding to the second random number, and transmits the second hash value to the first block of the smart contract.

In step S302, the first electronic device generates a first random number and a first hash value corresponding to the first random number, and transmits the first hash value to the second block of the smart contract.

In step S303, the first electronic device transmits the first random number to the third block of the smart contract and the second electronic device transmits the second random number to the third block.

In step S304, the fifth block of the smart contract receives the real-time transaction index, and generates a random seed according to the real-time transaction index, the first random number and the second random number and calculates a result of the smart contract in the fifth block according to the random seed.

In summary, in the disclosure, the blockchain random number generating system and the blockchain random number generating method receives a second hash value corresponding to the second random number from the second electronic device by the first block of the smart contract, and the contract is established after the second block of the smart contract receives the first hash value corresponding to the first random number from the first electronic device. Then, the third block of the smart contract receives the first random number from the first electronic device and receives the second random number from the second electronic device to determine whether the first electronic device and the second electronic device are in breach of contract. The fifth block of the smart contract receives the real-time transaction index and generates the random seed according to the real-time transaction index, the first random number and the second random number, and calculates the result of the smart contract in the fifth block according to the random seed. Therefore, neither party can predict or control all the variables in advance to predict the result of contract when the contract is signed.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. A blockchain random number generating system, comprising:
   a first electronic device;
   a second electronic device; and
   a smart contract, wherein
   the second electronic device generates a second random number and a second hash value corresponding to the second random number, and transmits the second hash value to a first block of the smart contract,
   the first electronic device generates a first random number and a first hash value corresponding to the first random number, and transmits the first hash value to a second block of the smart contract,
   the first electronic device transmits the first random number to a third block of the smart contract and the second electronic device transmits the second random number to the third block,
   a fifth block of the smart contract receives a real-time transaction index, and generates a random seed according to the real-time transaction index, the first random number, and the second random number, and calculates a result of the smart contract in the fifth block according to the random seed.

2. The blockchain random number generating system of claim 1, wherein the smart contract generates a random seed according to a block hash value of a fourth block, the real-time transaction index, the first random number, and the second random number and calculates a result of the smart contract in the fifth block according to the random seed, a block index value of the fourth block is a block index value of the fifth block minus one.

3. The blockchain random number generating system of claim 1, wherein the smart contract issues a penalty corresponding to the first electronic device when determining that a hash result of the first random number is not equal to the first hash value, the smart contract issues a penalty corresponding to the second electronic device when determining that a hash result of the second random number is not equal to the second hash value.

4. The blockchain random number generating system of claim 1, wherein when the smart contract receives the first hash value in the second block, the smart contract is in a contract-established state.

5. The blockchain random number generating system of claim 1, wherein the fifth block of the smart contract receives the real-time transaction index from an external data retrieval function.

6. A blockchain random number generating method, adaptable for a first electronic device, a second electronic device, and a smart contract, the blockchain random number generating method comprising:
   generating a second random number and a second hash value corresponding to the second random number by the second electronic device, and transmitting the second hash value to a first block of the smart contract;
   generating a first random number and a first hash value corresponding to the first random number by the first electronic device, and transmitting the first hash value to a second block of the smart contract;
   transmitting the first random number to a third block of the smart contract by the first electronic device and transmitting the second random number to the third block by the second electronic device; and
   receiving a real-time transaction index by a fifth block of the smart contract, and generating a random seed according to the real-time transaction index, the first random number and the second random number, and calculating a result of the smart contract in the fifth block according to the random seed.

7. The blockchain random number generating method of claim 6, wherein the smart contract generates a random seed according to a block hash value of a fourth block, the real-time transaction index, the first random number, and the second random number and calculates a result of the smart contract in the fifth block according to the random seed, a block index value of the fourth block is a block index value of the fifth block minus one.

8. The blockchain random number generating method of claim 6, wherein the smart contract issues a penalty corresponding to the first electronic device when determining that a hash result of the first random number is not equal to the first hash value, the smart contract issues a penalty corresponding to the second electronic device when determining that a hash result of the second random number is not equal to the second hash value.

9. The blockchain random number generating method of claim 6, wherein when the smart contract receives the first hash value in the second block, the smart contract is in a contract-established state.

10. The blockchain random number generating method of claim 6, wherein the fifth block of the smart contract receives the real-time transaction index from an external data retrieval function.

* * * * *